(12) United States Patent
Ienaga et al.

(10) Patent No.: US 10,618,508 B2
(45) Date of Patent: Apr. 14, 2020

(54) CONTROL APPARATUS FOR VEHICLE AND CONTROL METHOD FOR VEHICLE

(71) Applicant: SUBARU CORPORATION, Tokyo (JP)

(72) Inventors: Hiroshi Ienaga, Tokyo (JP); Shinichi Sakaguchi, Tokyo (JP); Takahiro Kobayashi, Tokyo (JP); Takeshi Yoneda, Tokyo (JP); Junya Ogasahara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 6 days.

(21) Appl. No.: 15/958,144

(22) Filed: Apr. 20, 2018

(65) Prior Publication Data

US 2019/0001952 A1 Jan. 3, 2019

(30) Foreign Application Priority Data

Jun. 29, 2017 (JP) .................................. 2017-127000

(51) Int. Cl.
*B60W 10/02* (2006.01)
*B60K 17/356* (2006.01)
(Continued)

(52) U.S. Cl.
CPC ......... *B60W 10/023* (2013.01); *B60K 17/354* (2013.01); *B60K 17/356* (2013.01); *B60K 28/16* (2013.01); *B60K 28/165* (2013.01); *B60L 15/20* (2013.01); *B60W 10/02* (2013.01); *B60W 10/08* (2013.01); *B60W 10/16* (2013.01);
(Continued)

(58) Field of Classification Search
CPC ............... B60W 10/023; B60W 10/16; B60W 30/18172; B60W 30/02; B60W 50/0097; B60W 10/02; B60W 10/08; B60W 2510/081; B60W 2550/402; B60W 2550/12; B60W 2550/148; B60K 28/16; (Continued)

(56) References Cited

U.S. PATENT DOCUMENTS

2013/0253750 A1    9/2013  Otake
2015/0217775 A1*   8/2015  Ono .................. B60W 50/0097
                                                         701/1
2017/0320389 A1*  11/2017  Burt ..................... B60K 17/346

FOREIGN PATENT DOCUMENTS

JP    H09-290655 A    11/1997
JP    2000-082198 A    3/2000
(Continued)

OTHER PUBLICATIONS

Japanese Office Action, dated Mar. 26, 2019, in Japanese Application No. 2017-127000 and English Translation thereof.

*Primary Examiner* — Yuen Wong
(74) *Attorney, Agent, or Firm* — McGinn I. P. Law Group, PLLC.

(57) ABSTRACT

A control apparatus for a vehicle includes: a decider; and a rotation speed controller. The decider is configured to decide on a basis of a traveling state of the vehicle that a wheel which is spun is coupled to a drive source to increase a number of driving wheels. The rotation speed controller is configured to decide increase a rotation speed of the drive source in advance in accordance with an information of a vehicle behavior unstableness degree which is acquired from an outside of the vehicle before the wheel is coupled to the drive source.

14 Claims, 8 Drawing Sheets

(51) Int. Cl.
  *B60K 17/354* (2006.01)
  *B60K 28/16* (2006.01)
  *B60W 10/08* (2006.01)
  *B60L 15/20* (2006.01)
  *B60W 30/02* (2012.01)
  *B60W 30/18* (2012.01)
  *B60W 10/16* (2012.01)
  *B60W 50/00* (2006.01)
  *F16H 48/22* (2006.01)

(52) U.S. Cl.
  CPC ...... *B60W 30/02* (2013.01); *B60W 30/18172* (2013.01); *B60W 50/0097* (2013.01); *B60L 2240/10* (2013.01); *B60L 2240/461* (2013.01); *B60L 2240/64* (2013.01); *B60L 2240/645* (2013.01); *B60L 2240/647* (2013.01); *B60L 2260/50* (2013.01); *B60W 2510/081* (2013.01); *B60W 2550/12* (2013.01); *B60W 2550/148* (2013.01); *B60W 2550/402* (2013.01); *B60Y 2200/91* (2013.01); *F16H 48/22* (2013.01)

(58) Field of Classification Search
  CPC .. B60K 28/165; B60K 17/356; B60K 17/354; B60L 15/20; B60Y 2200/91; F16H 48/22
  See application file for complete search history.

(56) References Cited

FOREIGN PATENT DOCUMENTS

| | | | |
|---|---|---|---|
| JP | 2000-142321 A | | 5/2000 |
| JP | 2010-159020 A | | 7/2010 |
| JP | 2010159020 A | * | 7/2010 |
| JP | 2011-105024 A | | 6/2011 |
| JP | 2015-134534 A | | 7/2015 |
| WO | WO 2012/077204 A1 | | 6/2012 |

* cited by examiner

FIG. 8

| VEHICLE BEHAVIOR UNSTABLENESS DEGREE | DANGER DEGREE | RELIABILITY |
|---|---|---|
| 50% | WEATHER FORECAST IN SPOT a IS FOR SNOW | 50% |
| 75% | PRECEDING VEHICLE TRAVELING SPOT b SKIDS | 80% |
| 60% | INFORMATION OF LIVE CAMERA IN SPOT c IS FOR SNOW | 70% |
| 30% | INFORMATION OF LIVE CAMERA IN SPOT d IS FOR RAIN | 70% |

CONTROL APPARATUS FOR VEHICLE AND CONTROL METHOD FOR VEHICLE

CROSS-REFERENCE TO RELATED APPLICATIONS

The present application claims priority from Japanese Patent Application No. 2017-127000 filed on Jun. 29, 2017, the entire contents of which are hereby incorporated by reference.

BACKGROUND

1. Technical Field

The present invention relates to a control apparatus for a vehicle and a control method for a vehicle.

2. Related Art

For instance, Japanese Unexamined Patent Application Publication (JP-A) No. 2015-134534 below describes that a clutch is provided in a power transmission path between a motor and a wheel, and the clutch disconnects the power transmission path. The rotation speed of the motor is gradually increased by a target time point, and is synchronized with the rotation speed of the wheel.

SUMMARY OF THE INVENTION

An aspect of the present invention provides a control apparatus for a vehicle. The control apparatus includes: a decider configured to decide on a basis of a traveling state of the vehicle that a wheel which is spun is coupled to a drive source to increase a number of driving wheels; and a rotation speed controller configured to increase a rotation speed of the drive source in advance in accordance with an information of a vehicle behavior unstableness degree which is acquired from an outside of the vehicle before the wheel is coupled to the drive source.

An aspect of the present invention provides a control method for a vehicle. The control method includes: deciding on a basis of a traveling state of the vehicle that a wheel which is spun is coupled to a drive source to increase a number of driving wheels; and increasing a rotation speed of the drive source in advance in accordance with an information of a vehicle behavior unstableness degree which is acquired from an outside of the vehicle before the wheel is coupled to the drive source.

An aspect of the present invention provides a control apparatus for a vehicle. The control apparatus includes circuitry. The circuitry is configured to decide on a basis of a traveling state of the vehicle that a wheel which is spun is coupled to a drive source to increase a number of driving wheels. The circuitry is configured to increase a rotation speed of the drive source in advance in accordance with an information of a vehicle behavior unstableness degree which is acquired from an outside of the vehicle before the wheel is coupled to the drive source.

BRIEF DESCRIPTION OF THE DRAWINGS

FIG. 8 schematically illustrates a technique of calculating the vehicle behavior unstableness degree from the external information;

DETAILED DESCRIPTION

Figure 1:
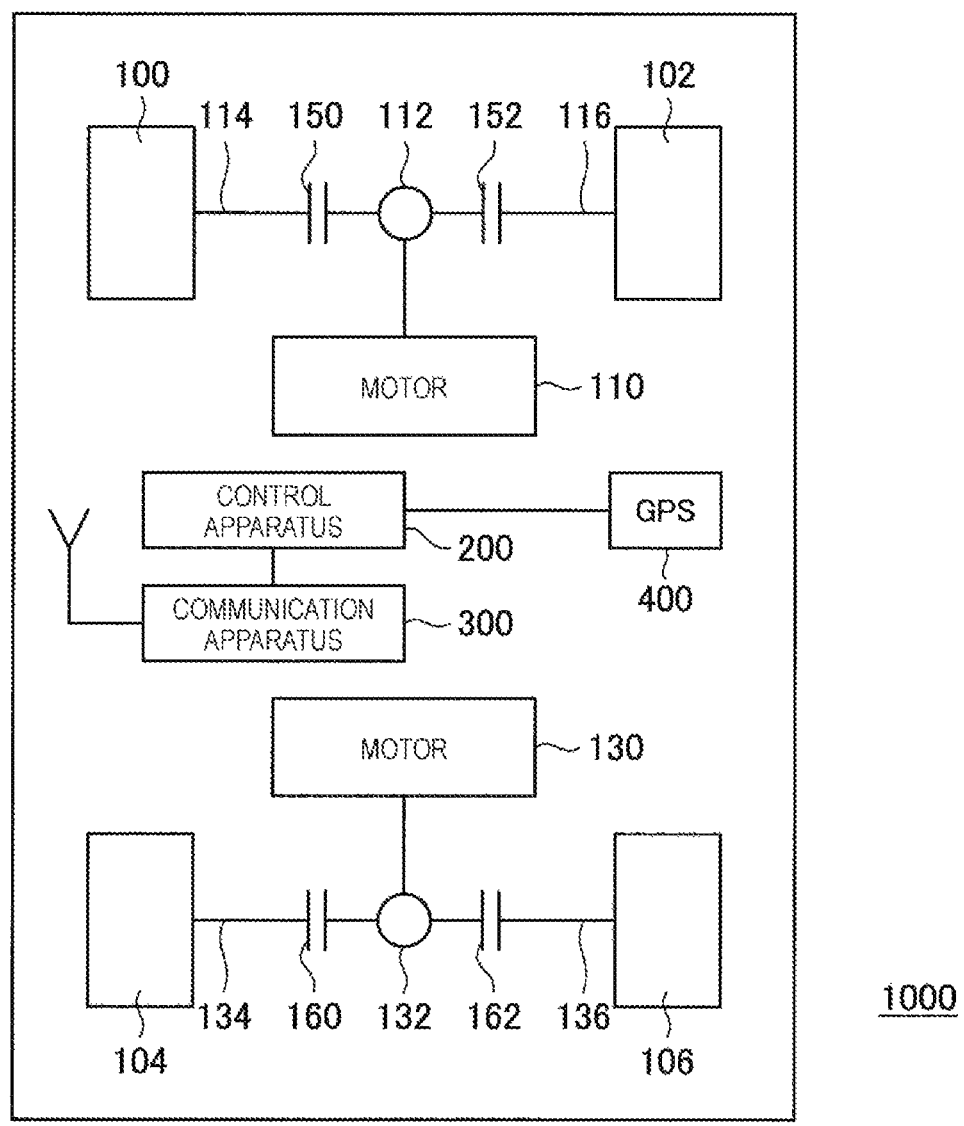
FIG. 1 schematically illustrates a component of a vehicle according to each example of the present invention.

Hereinafter, preferred examples of the present invention will be described in detail with reference to the appended drawings. Note that the following description is directed to illustrative examples of the disclosure and not to be construed as limiting to the present invention. Factors including, without limitation, numerical values, shapes, materials, components, positions of the components, and how the components are coupled to each other are illustrative only and not to be construed as limiting to the present invention. Further, in this specification and the appended drawings, structural elements that have substantially the same function and structure are denoted with the same reference numerals, and repeated description of these structural elements is omitted.

The states of road surfaces on which vehicles travel change every moment in accordance with conditions such as weather. It is therefore desirable to cancel the disconnections of clutches to increase wheels to which driving force is transmitted when road surfaces are expected to be slippery.

The technology described in JP-A No. 2015-134534 is supposed to prevent a motor from revving up and prevent a motor shock from occurring during a transition from the disengagement to engagement of a clutch, but is not supposed to engage the clutch in accordance with the traveling state of a vehicle such as the state of a road surface. Therefore, the technology described in JP-A No. 2015-134534 unfortunately fails to have the rotation speed of a motor increased in advance in accordance with a road surface state or the like when the traveling state of the vehicle deteriorates. The technology causes a response delay when the FWD or RWD driving state is switched to the AWD driving state. A sharp increase in the rotation speed of a motor for avoiding a response delay unfortunately leads to failure to prevent a shock from occurring when the clutch is engaged.

It is desirable to provide a control apparatus for a vehicle and a novel and improved control method for a vehicle each of which can surely avoid a response delay when a spinning wheel is coupled to a drive source.

1. First Example

First, a first example of the present invention will be described on the basis of the drawings. FIG. 1 schematically illustrates components of a vehicle 1000 according to each example of the present invention. As illustrated in FIG. 1, this vehicle 1000 includes front wheels 100 and 102, rear wheels 104 and 106, a motor 110 that drives the front wheels 100 and 102, and a motor 130 that drives the rear wheels. The vehicle 1000 also includes a differential gear 112 on the front wheel side, drive shafts 114 and 116 on the front wheel side, and clutches 150 and 152 on the front wheel side. The vehicle 1000 also includes a differential gear 132 on the rear wheel side, drive shafts 134 and 136 on the rear wheel side, and clutches 160 and 162 on the rear wheel side.

The driving force of the motor 110 on the front wheel side is transmitted from the differential gear 112 to the drive shafts 114 and 116, and the drive shafts 114 and 116 drive the front wheels 100 and 102. Similarly, the driving force of the motor 130 on the rear wheel side is transmitted from the differential gear 132 to the drive shafts 134 and 136, and the drive shafts 134 and 136 drive the rear wheels 104 and 106. Note that there may be provided a deceleration mechanism between the motor 110 and the differential gear 112. Similarly, there may be provided a deceleration mechanism between the motor 130 and the differential gear 132.

On the front wheel side, the drive shaft 114 includes the clutch 150, and the drive shaft 116 includes the clutch 152. Similarly, on the rear wheel side, the drive shaft 134 includes the clutch 160, and the drive shaft 136 includes the clutch 162. Note that FIG. 1 illustrates an electric vehicle with the front wheels and the rear wheels independently driven, but the electric vehicle may have the wheels independently driven as the wheel drive type.

When the vehicle 1000 is driven in all-wheel drive (AWD), the motor 110 on the front wheel side and the motor 130 on the rear wheel side both generate driving force. The clutches 150 and 152 on the front wheel side are then engaged, and the clutches 160 and 162 on the rear wheel side are engaged. This transmits the driving force of the motor 110 on the front wheel side to the front wheels 100 and 102 via the differential gear 112 and the drive shafts 114 and 116. In addition, the driving force of the motor 130 on the rear wheel side is transmitted to the rear wheels 104 and 106 via the differential gear 132 and the drive shafts 134 and 136. It is thus possible to drive the vehicle 1000 in AWD.

Meanwhile, when the vehicle 1000 is driven in front-wheel drive, the motor 110 on the front wheel side generates driving force, and the motor 130 on the rear wheel side is stopped. In addition, while the clutches 150 and 152 on the front wheel side are engaged, the clutches 160 and 162 on the rear wheel side are released. This transmits only the driving force of the motor 110 on the front wheel side to the front wheels 100 and 102, and it is thus possible to drive the vehicle 1000 in front-wheel drive. Here, once driving force generated by a road surface spinning the rear wheels 104 and 106 rotates the motor 130 on the rear wheel side, the resistance generated by rotating the motor 130 causes a loss in the driving force of the motor 110 on the front wheel side. However, the clutches 160 and 162 on the rear wheel side are released, and thus the driving force generated by the road surface spinning the rear wheels 104 and 106 is not transmitted to the motor 130 on the rear wheel side. Accordingly, no loss is caused in the driving force of the motor 110 on the front wheel side, and it is possible to prevent the efficiency from decreasing.

In addition, when the vehicle 1000 is driven in rear-wheel drive, the motor 130 on the rear wheel side generates driving force, and the motor 110 on the front wheel side is stopped. In addition, while the clutches 160 and 162 on the rear wheel side are engaged, the clutches 150 and 152 on the front wheel side are released. This transmits only the driving force of the motor 130 on the rear wheel side to the rear wheels 104 and 106, and it is thus possible to drive the vehicle 1000 in rear-wheel drive. Here, once driving force generated by a road surface spinning the front wheels 100 and 102 rotates the motor 110 on the front wheel side, the resistance generated by rotating the motor 110 causes a loss in the driving force of the motor 130 on the rear wheel side. However, the clutches 150 and 152 on the front wheel side are released, and thus the driving force generated by the road surface spinning the front wheels 100 and 102 is not transmitted to the motor 110 on the front wheel side. Accordingly, no loss is caused in the driving force of the motor 130 on the rear wheel side, and it is possible to prevent the efficiency from decreasing.

Note that the vehicle 1000 may include only the clutches 150 and 152 on the front wheel side, and dispense with the clutches 160 and 162 on the rear wheel side. In addition, the vehicle 1000 may include only the clutches 160 and 162 on the rear wheel side, and dispense with the clutches 150 and 152 on the front wheel side. Including only the clutches 150 and 152 on the front wheel side is equivalent to constantly engaging the clutches 160 and 162 on the rear wheel side. It is possible to drive the vehicle 1000 in AWD or rear-wheel drive. In addition, including only the clutches 160 and 162 on the front wheel side is equivalent to constantly engaging the clutches 150 and 152 on the front wheel side. It is possible to drive the vehicle 1000 in AWD or front-wheel drive.

If a road surface condition is changed to make the vehicle behavior unstable while the vehicle 1000 is traveling in front-wheel drive or rear-wheel drive, front-wheel drive or rear-wheel drive is switched to AWD by engaging a released clutch. Impact is then prevented from occurring at the time of clutch engagement, and thus the rotation speed of the motor on the stopped side is synchronized with the rotation speed of the wheels to engage the released clutch. An instance will be described in which front-wheel drive is switched to AWD. The rotation speed of the motor 130 on the stopped rear wheel side is brought into agreement with the rotation speed of the rear wheels 104 and 106 to engage the clutches 160 and 162 on the rear wheel side. More specifically, the differential gear 132 has a predetermined gear ratio. Accordingly, the rotation speed of the motor 130 on the rear wheel side is brought into agreement with the rotation speed obtained by changing the rotation speed of the rear wheels 104 and 106 by the gear ratio of the differential gear 132 to engage the clutches 160 and 162. In addition, if there is provided a deceleration mechanism between the differential gear 132 and the motor 130, the rotation speed of the motor 130 on the rear wheel side is brought into agreement with the rotation speed obtained by changing the rotation speed of the rear wheels 104 and 106 by the gear ratios of the differential gear 132 and the deceleration mechanism to engage the clutches 160 and 162. The following also refers to control to bring motor rotation speed into agreement with wheel rotation speed before clutch engagement as rotation speed synchronization control.

Performing rotation speed synchronization control makes it possible to prevent impact from occurring at the time of clutch engagement. However, performing rotation speed synchronization control after a disturbed vehicle behavior such as skid occurrence is detected causes a delay before completing a transition to AWD and makes it difficult to immediately address the disturbed vehicle behavior.

Therefore, in the example, while the vehicle 1000 is traveling in front-wheel drive or rear-wheel drive, information regarding the condition of a road that is going to be traveled is acquired, and the behavior stableness of the vehicle 1000 is determined on the basis of this information. If the behavior of the vehicle 1000 is predicted to be unstable, rotation speed synchronization control is performed in advance. For the sake of explanation, the following describes the case where rear-wheel drive transitions to AWD. However, the same applies when front-wheel drive transitions to AWD.

Figure 2:
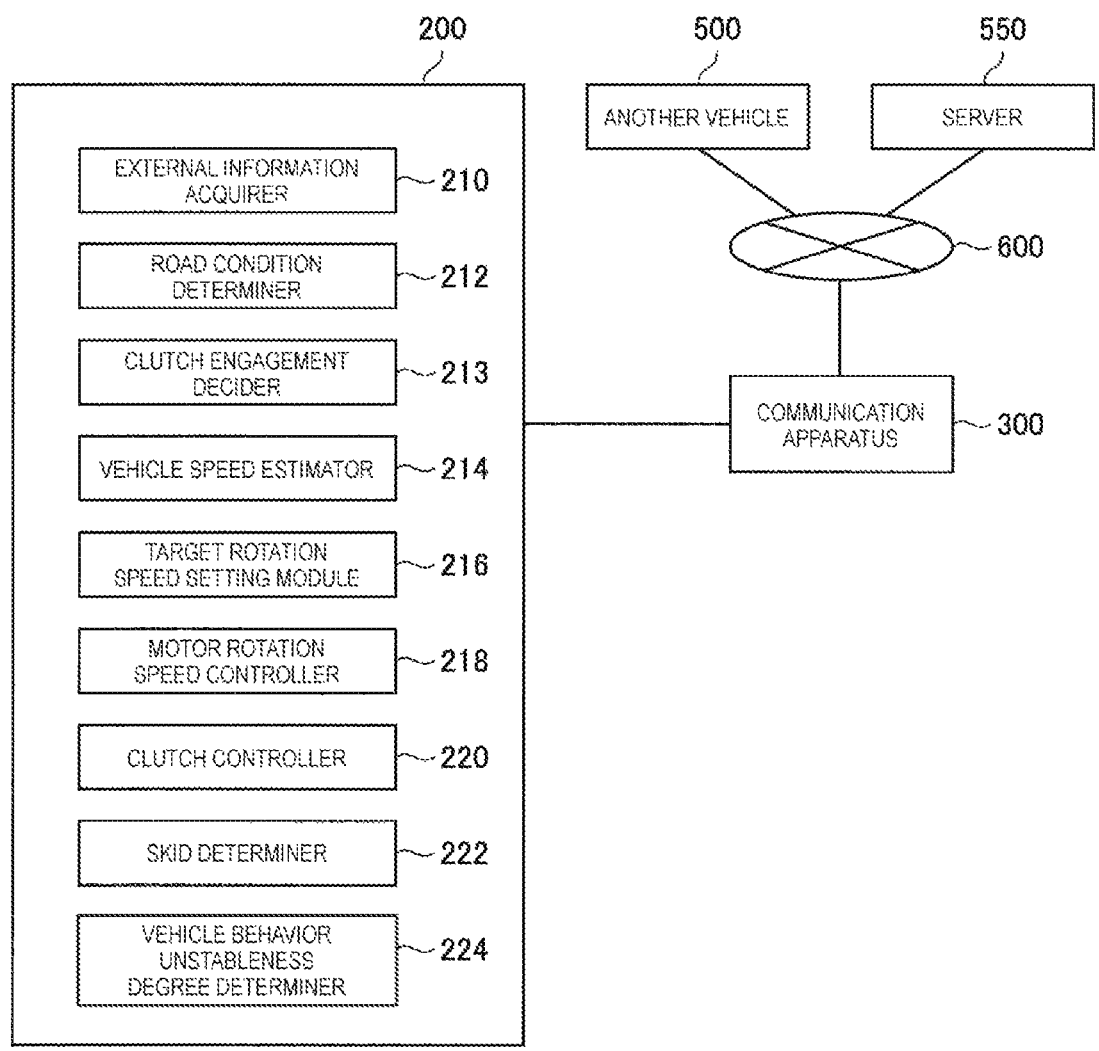
FIG. 2 schematically illustrates a control apparatus and a communication apparatus, and a peripheral component thereof.

As illustrated in FIG. 1, the vehicle 1000 includes a control apparatus 200, a communication apparatus 300, and a position detection apparatus (global positioning system (GPS) 400. FIG. 2 schematically illustrates the control apparatus 200 and the communication apparatus 300, and peripheral components thereof. The control apparatus 200 includes an external information acquirer 210, a road condition determiner 212, a clutch engagement decider 213, a vehicle speed estimator 214, a target rotation speed setting module 216, a motor rotation speed controller (rotation speed synchronization module) 218, a clutch controller 220, a kid determiner 222, and a vehicle behavior unstableness degree determiner 224. Note that each of the components of the control apparatus 200 illustrated in FIG. 1 can include a circuit (hardware) or a central processing unit such as a CPU, and a program (software) for bringing it into operation.

The communication apparatus 300 wirelessly communicates with an external vehicle (another vehicle) 500, a server 550 that provides various kinds of information, and the like. The communication apparatus 300 may communicate with the vehicle 500 and the server 550 via a network 600 such as the Internet.

The communication apparatus 300 receives external information from the external vehicle 500, the server 550 that provides various kinds of information, or the like. The external information acquirer 210 of the control apparatus 200 acquires external information received by the communication apparatus 300. The road condition determiner 212 determines a road condition on the basis of the external information received by the communication apparatus 300.

Figure 3:
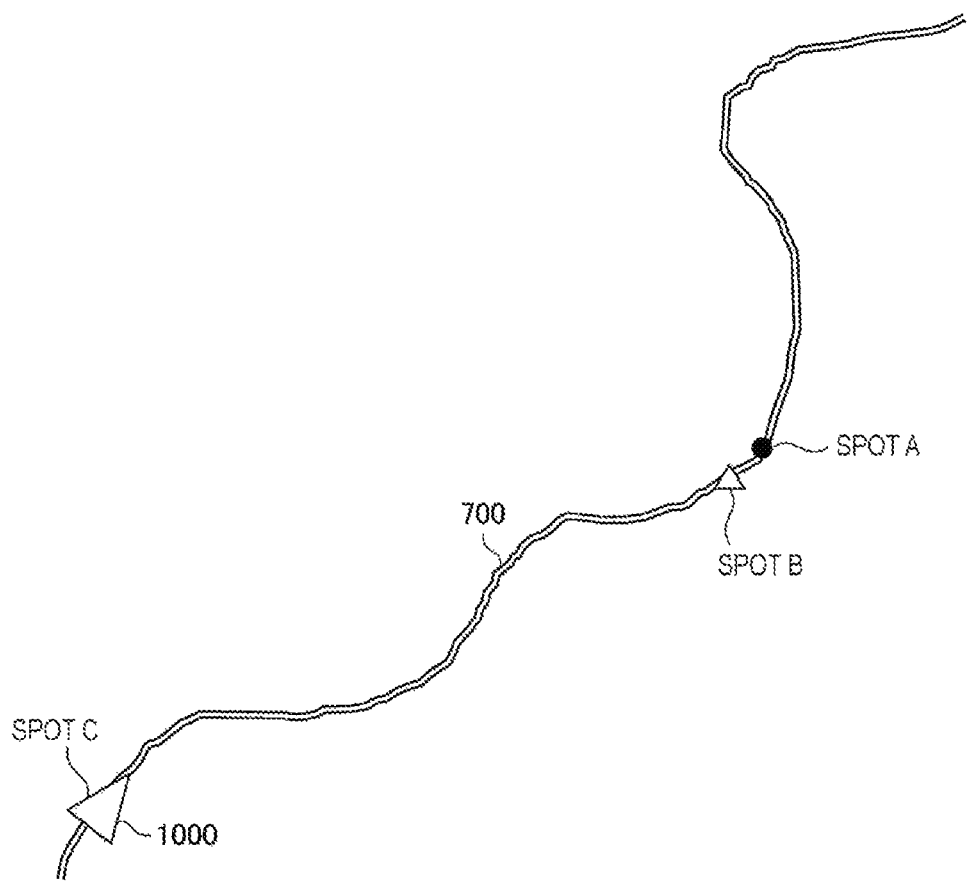
FIG. 3 schematically illustrates the vehicle, and a road that the vehicle is going to travel in future.

FIG. 3 schematically illustrates the vehicle 1000, and a road 700 that the vehicle 1000 is going to travel in the future. At the time point illustrated in FIG. 3, the vehicle 1000 travels a spot C. The road condition determiner 212 determines a road condition on the basis of the external information. As an instance, the road condition determiner 212 determines on the basis of the external information that the road surface is slippery in the spot A illustrated in FIG. 3. The clutch engagement decider 213 engages the clutches 150 and 152 on the front wheel side to decide a spot in which rear-wheel drive transitions to AWD. It is determined by the road condition determiner 212 that the road surface is slippery in the spot A, and the clutch engagement decider 213 thus decides the spot A illustrated in FIG. 3 as a clutch engagement spot.

Figure 4:
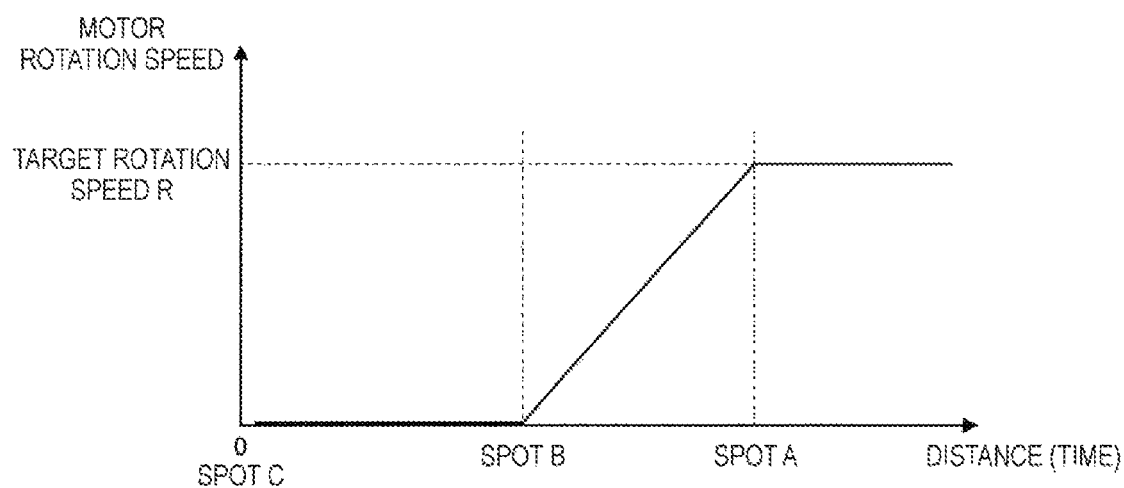
FIG. 4 is a characteristic diagram illustrating a relationship between distance (horizontal axis) from the vehicle to a spot A and rotation speed (vertical axis) of a motor on a front wheel side.

FIG. 4 is a characteristic diagram illustrating the relationship between the distance (horizontal axis) from the vehicle 1000 to the spot A and the rotation speed (vertical axis) of the motor 110 on the front wheel side. The vehicle speed estimator 214 estimates the vehicle speed in the spot A. The vehicle speed estimator 214 estimates the vehicle speed in the spot A from map information, speed limit information or the position or speed of a preceding vehicle or an oncoming vehicle in the spot A which is acquired by the external information acquirer 210 as external information. The estimated value of the vehicle speed may be changed as needed by taking the current vehicle speed or the driver's operation into consideration. The target rotation speed setting module 216 sets target rotation speed R for rotation speed synchronization control on the basis of the vehicle speed in the spot A. The target rotation speed R is a value obtained by converting the vehicle speed in the spot A into motor rotation speed. The target rotation speed R is set on the basis of the vehicle speed in the spot A, the tire radii of the front wheels 100 and 102, the gear ratio of the differential gear 112 on the front wheel side, the gear ratio of a deceleration mechanism if there is any deceleration mechanism between the motor 110 and the differential gear 112, and the like.

The motor rotation speed controller 218 controls the motor 110 such that the rotation speed of the motor 110 becomes the target rotation speed R in the spot A. As illustrated in FIG. 4, the motor rotation speed controller 218 starts the motor 110 when the vehicle 1000 reaches a spot B such that the rotation speed of the motor 110 becomes the target rotation speed R in the spot A, and controls the motor 110 such that the rotation speed of the motor 110 is the target rotation speed R when the vehicle 1000 reaches the spot A. The motor rotation speed controller 218 starts the motor 110 with the increase rate of the rotation speed of the motor 110 set at the maximum increase rate when the vehicle 1000 reaches the spot B, where the target rotation speed R can be reached in the spot A. More specifically, the motor rotation speed controller 218 calculates, for the spot A, the spot B, where rotation speed synchronization is begun, on the basis of the target rotation speed, the current rotation speed, rotation speed grade that allows for rotation speed synchronization with no shock at the time of clutch engagement, and the like. The motor rotation speed controller 218 begins rotation speed synchronization control when this spot B is passed. The timing at which rotation speed synchronization is begun may be set by time.

Note that it is possible to obtain the distance from the spot B to the spot A from the time from the start of the motor 110 to the target rotation speed and the vehicle speed from the spot B to the spot A if the maximum value of the increase rate of the rotation speed of the motor 110 is obtained in advance. The vehicle speed estimator 214 then estimates the vehicle speed from the spot B to the spot A on the basis of external information. Applying the spot A and the spot B to map information acquired by the server 550 as external information makes it possible to start the motor 110 when the position detector 400 detects that the vehicle 1000 reaches the spot B.

As described above, if rotation speed synchronization control is performed on the motor 110 such that the rotation speed of the motor 110 becomes the target rotation speed R in the spot A, where rear-wheel drive is switched to AWD, the rotation speed of the motor 110 agrees with the rotation speed of the front wheels 100 and 102 in the spot A. The clutch controller 220 engages the clutches 150 and 152 on the front wheel side with the rotation speed of the motor 110 in agreement with the rotation speed of the front wheels 100 and 102. This makes it possible to surely prevent impact at the time of clutch engagement. In addition, completely switched to AWD in the spot A, the vehicle 1000 can be switched to AWD earlier than the vehicle 1000 is switched to AWD after a skid is detected in the spot A. It is then possible to make the behavior of the vehicle 1000 stable.

If the vehicle 1000 is expected to decelerate and reach the spot A, the rotation speed of the motor 110 is not synchronized by starting the motor 110, but the rotation speed of the motor 110 may be synchronized with the rotation speed of the front wheels 100 and 102 by engaging the clutches 150 and 152 and rotating the motor 110 with the rotation of the front wheels 100 and 102. In this case, abruptly engaging the clutches 150 and 152 causes a shock at the time of engagement. Accordingly, it is desirable to use partial clutch engagement to engage the clutches 150 and 152. This allows for rotation speed synchronization on the motor 110 with the rotation torque of the front wheels 100 and 102 of the decelerated vehicle 1000. Further, the use of torque control on the motor 130 on the rear wheel side, on which the clutches 160 and 162 are engaged, makes it possible to generate greater deceleration. This makes it possible to perform rotation speed synchronization control during deceleration efficiently than starting the motor 110.

Figure 9:
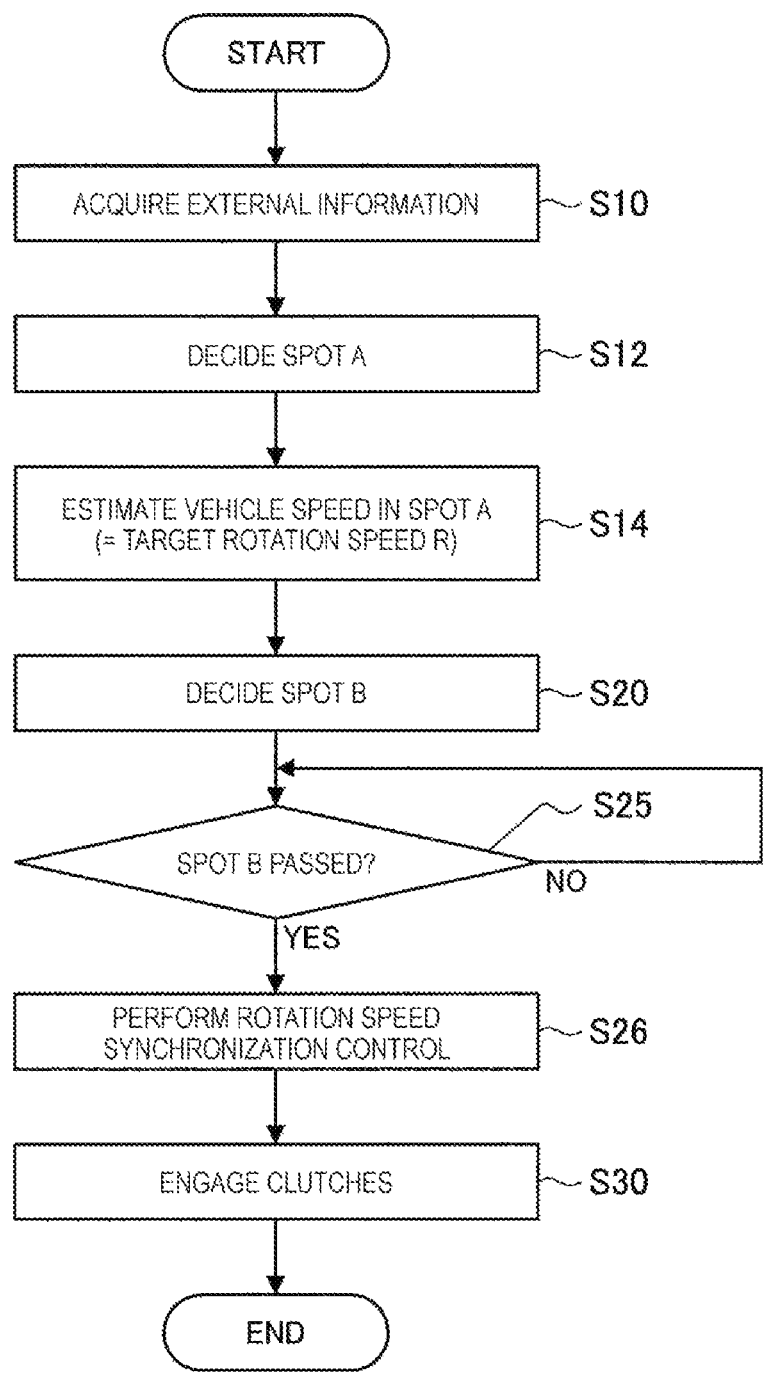
FIG. 9 is a flowchart for describing processing performed in a control apparatus in a first example.

Next, on the basis of the flowchart of FIG. 9, processing performed in the control apparatus 210 in the first example will be described. First, in step S10, the external information acquirer 130 acquires external information. Next, in step S12, the clutch engagement decider 213 decides the spot A, where the clutches 150 and 152 are engaged.

Next, in step S14, the vehicle speed estimator 214 estimates the vehicle speed in the spot A. On the basis of an estimation result of the vehicle speed in step S14, the target rotation speed R is decided. Next, in step S20, the spot B, where the motor 110 is started for reaching the target rotation speed R in the spot A, is decided.

Next, in step S25, it is determined whether the spot B is passed. If the spot B is passed, the flow proceeds to step S26 to perform rotation speed synchronization control. In rotation speed synchronization control in step S26, the motor 110 is controlled such that the motor 110 is started when the vehicle 1000 reaches the spot B, and the rotation speed of the motor 110 is the target rotation speed R when the vehicle 1000 reaches the spot A. This increases the rotation speed of the motor 110 to the target rotation speed R in the spot A, and then engages the clutches 150 and 152 in the spot A in step S30. After step S30, the processing terminates (END). Meanwhile, if the spot B is not passed in step S25, the flow waits in step S25.

As described above, increasing the motor rotation speed in advance from the spot B causes the rotation speed of the motor 110 to become the target rotation speed R in the spot A, and causes the rotation speed of the motor 110 to agree with the rotation speed of the front wheels 100 and 102. This makes it possible to surely prevent impact at the time of clutch engagement. In addition, completely switching to AWD in the spot A, it is possible to make the behavior of the vehicle 1000 stable more surely than the vehicle 1000 is switched to AWD after a skid is detected in the spot A.

2. Second Example

Next, a second example of the present invention will be described. In the first example, the rotation speed of the motor 110 is controlled in accordance with the road condition of the spot A. However, it is sometimes desirable to increase the rotation speed of the motor 110 in accordance with the road condition before the spot A. In the second example, an instance will be described in which motor rotation speed is increased in advance in accordance with the condition of a road that is going to be traveled in the future in addition to the control in the first example. Note that, in the second example, an instance will also be described in which rear-wheel drive is switched to AWD.

As illustrated in FIG. 2, the control apparatus 200 includes a skid determiner 222. The skid determiner 222 determines on the basis of the motor torque of a driving wheel, the motor rotation speed of the driving wheel, and the like whether the vehicle 1000 skids. For instance, the skid determiner 222 determines that a skid occurs, when the motor torque sharply decreases or the motor rotation speed sharply increases.

Once the skid determiner 222 determines that the vehicle 1000 skids, the clutch engagement decider 213 decides that the clutches 150 and 152 are engaged, and the clutch controller 220 engages the clutches 150 and 152 on the front wheel side. It takes time to increase the motor rotation speed in spite of clutch engagement feedback control based on such a skid determination if the motor 110 on the front wheel side is stopped at the time of the skid determination. Accordingly, it takes to engage the clutches. Therefore, in the second example, the motor rotation speed is increased in advance on the basis of an index (vehicle behavior unstableness degree) indicating the unstableness of the vehicle, and the amount of control on the motor rotation speed at the time of the skid determination is kept minimum to make it possible to immediately engage the clutches at the time of the skid determination.

Figure 5:
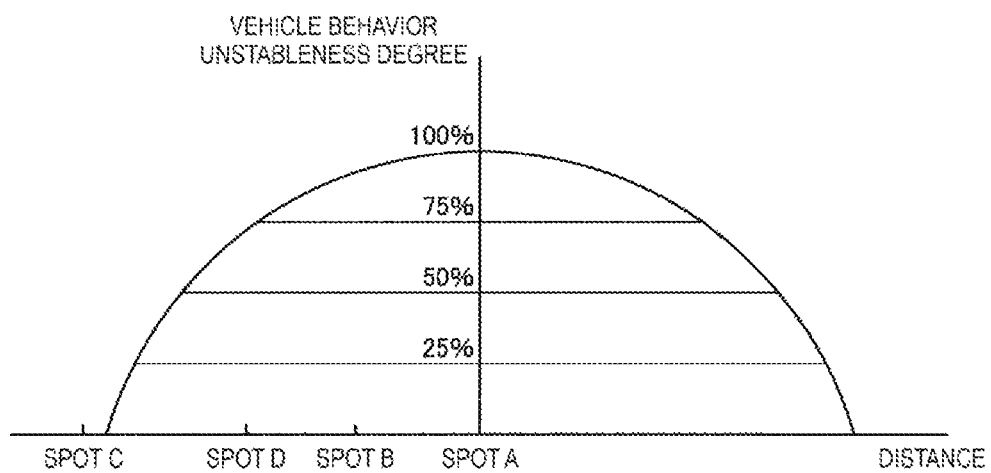
FIG. 5 schematically illustrates a vehicle behavior unstableness degree that is obtained from external information, and based on a danger degree around the spot A and reliability.

FIG. 5 schematically illustrates a vehicle behavior unstableness degree around the spot A which is acquired from external information. In FIG. 5, the horizontal axis represents the distance from the spot A. The vertical axis represents a vehicle behavior unstableness degree (%). The vehicle behavior unstableness degree indicates that the vehicle becomes more unstable with an increase in the value. Once the vehicle behavior unstableness degree reaches 100%, it is necessary to switch to AWD. For instance, when it snows in the spot A, the vehicle behavior unstableness degree around the spot A characteristically indicates a decrease from the maximum value in the spot A with an increase in the distance from the spot A as illustrated in FIG. 5.

Figure 6:
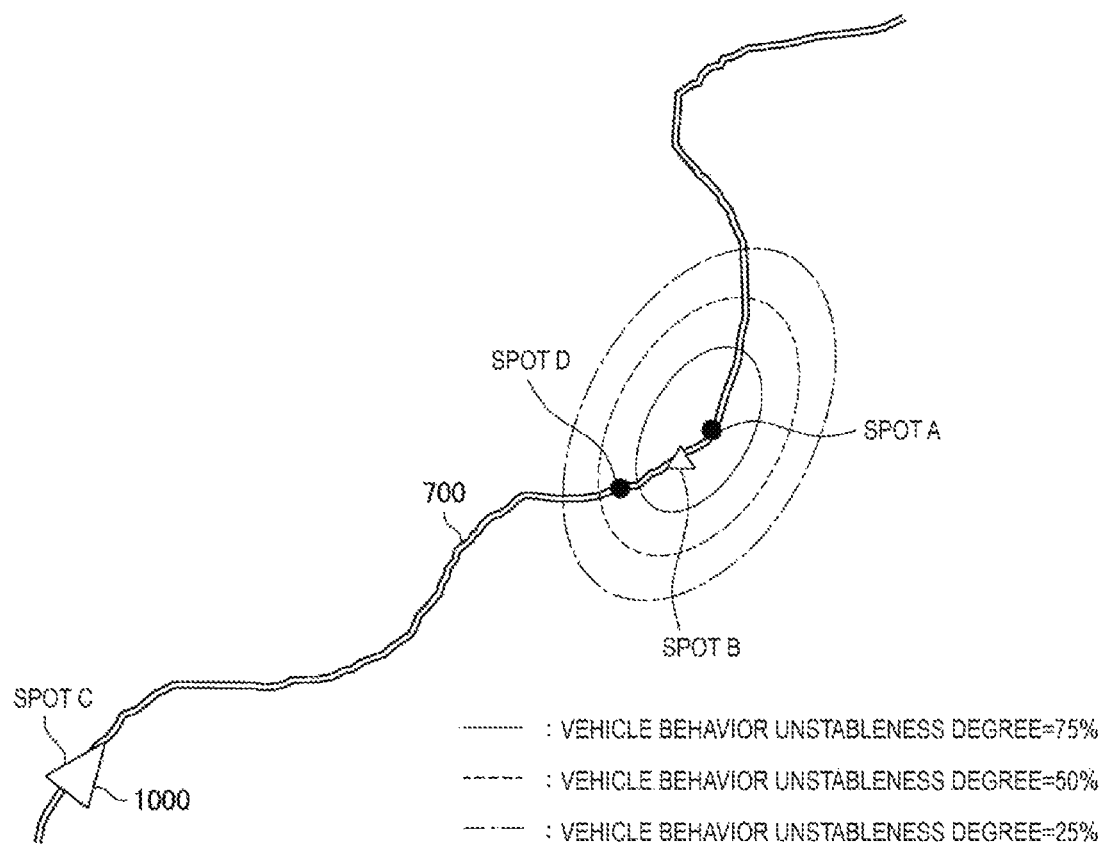
FIG. 6 schematically illustrates that the vehicle behavior unstableness degree illustrated in FIG. 5 is applied to the diagram of the road in FIG. 3.

FIG. 6 schematically illustrates that the vehicle behavior unstableness degree illustrated in FIG. 5 is applied to the diagram of the road 700 in FIG. 3. As illustrated in FIG. 6, the vehicle behavior unstableness degree is not 0 even at position before the spot B. In the second example, increasing the rotation speed of the motor 110 on the basis of the vehicle behavior unstableness degree consequently starts the motor 110 before the spot B. Increasing the rotation speed of the motor 110 in advance in accordance with the value of the vehicle behavior unstableness degree allows the motor rotation speed to reach the target rotation speed in a shorter time if the behavior of the vehicle 1000 becomes unstable before the spot A is reached, and allows the vehicle 1000 to quickly switch to AWD.

Specifically, on the basis of the target rotation speed R in the spot A, where it is necessary to switch to AWD, when the vehicle 1000 reaches a certain spot, the rotation speed of the motor 110 is increased to the target rotation speed obtained by multiplying the vehicle behavior unstableness degree in that spot by the target rotation speed R. The rotation speed is controlled by the motor rotation speed controller 218. Note that, when the motor rotation speed 110 is increased to the target rotation speed around the spot A illustrated in FIG. 7 in accordance with the driving of the vehicle 1000, the motor rotation speed 110 may be increased stepwise as illustrated by dashed lines in FIG. 7.

Figure 7:
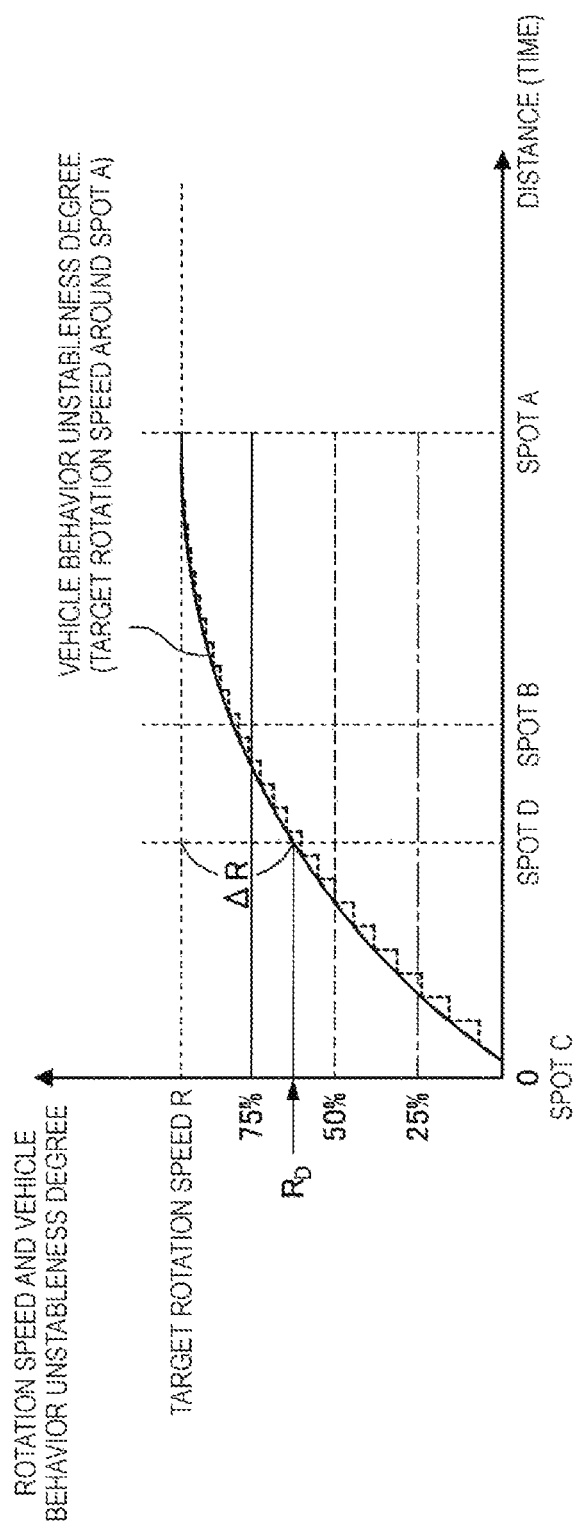
FIG. 7 is a characteristic diagram obtained by applying the vehicle behavior unstableness degree illustrated in FIG. 5 to FIG. 4.

FIG. 7 is a characteristic diagram obtained by applying the vehicle behavior unstableness degree illustrated in FIG. 5 to FIG. 4. As illustrated in FIG. 7, in the second example, the "target rotation speed around the spot A" is decided in accordance with the vehicle behavior unstableness degree in the spot where the vehicle 1000 is positioned. The "target rotation speed around the spot A" is a value obtained by multiplying the vehicle behavior unstableness degree (%) corresponding to the position of the vehicle 1000 by the target rotation speed R.

Before clutch engagement, the rotation speed of the motor 110 is increased to the "target rotation speed around the spot A." Accordingly, rotation speed synchronization control is performed such that the motor 110 has higher rotation speed nearer to the spot A. For instance, control is performed such that the target rotation speed of the motor 110 reaches $R_D$ when the vehicle 1000 reaches a spot D illustrated in FIG. 7. The vehicle behavior thus becomes unstable before the spot A is reached. When a skid determination is made in the spot D, the rotation speed is increased to the target rotation speed $R_D$ in the spot D. Accordingly, if the vehicle speed at this time point is the vehicle speed corresponding to the target rotation speed R, an increase in the rotation speed of the motor 110 by $\Delta R$ illustrated in FIG. 7 suffices to reach the target rotation speed R. Therefore, it is possible to reduce the amount ($=\Delta R$) of rotation speed synchronization control in advance. It is possible to reach the target rotation speed R in a shorter time as compared with a motor rotation speed of 0 in the spot D. It is possible to considerably improve the responsiveness of switching to AWD. If the vehicle speed in the spot D is different from the target rotation speed R, the rotation speed of the motor 110 only has to be increased to the rotation speed corresponding to the vehicle speed in the spot D.

FIG. 8 schematically illustrates a technique for the vehicle behavior unstableness degree determiner 224 to determine the vehicle behavior unstableness degree from external information. The vehicle behavior unstableness degree is calculated from information of a danger degree and information of reliability. As illustrated in FIG. 8, examples of the information of a danger degree include, in given spots a to d on the road 700, information such as "weather forecast of the spot a is for snow," "preceding vehicle traveling the spot b skids," "information of a live camera in the spot c is for snow," and "information of a live camera in the spot d is for rain." For instance, in the case of information of weather forecasts, "snow" has a higher danger degree than "rain."

The information of reliability indicates the reliability of the information of a danger degree. The information of a danger degree that the "weather forecast of the spot a is for snow" is information acquired from a weather forecast. Some weather forecasts can be wrong, so that the reliability is relatively low: 50%. The information of a danger degree that a "preceding vehicle traveling the spot b skids" is information acquired from a preceding vehicle actually traveling the spot A, so that the reliability is high: 80%. The information of a danger degree that "information of a live camera in the spot c is for snow" and "information of a live camera in the spot d is for rain" is information acquired from live cameras installed in the spot c and the spot d, so that the reliability is relatively high: 70%.

In FIG. 8, the external information acquirer 210 can acquire the information of weather forecasts as external information through communication between the server 550 that distributes the information of weather forecasts and the communication apparatus 300. In addition, the external information acquirer 210 can acquire the information indicating that a preceding vehicle skids as external information through communication between the external vehicle 500 and the communication apparatus 300. Note that the external information acquirer acquires positional information of a preceding vehicle as external information along with the information indicating that the preceding vehicle skids. The clutch engagement decider 213 can therefore decides the position at which the preceding vehicle skids as a clutch engagement position. The external information acquirer 210 can acquire the information of a live camera as external information through communication between the server 550 that distributes the information of the live camera and the communication apparatus 300.

The information of a danger degree is then converted into a numeric value in accordance with the danger degree. The information of a danger degree is multiplied by the information of reliability. This makes it possible to calculate the vehicle behavior unstableness degree.

Figure 10:
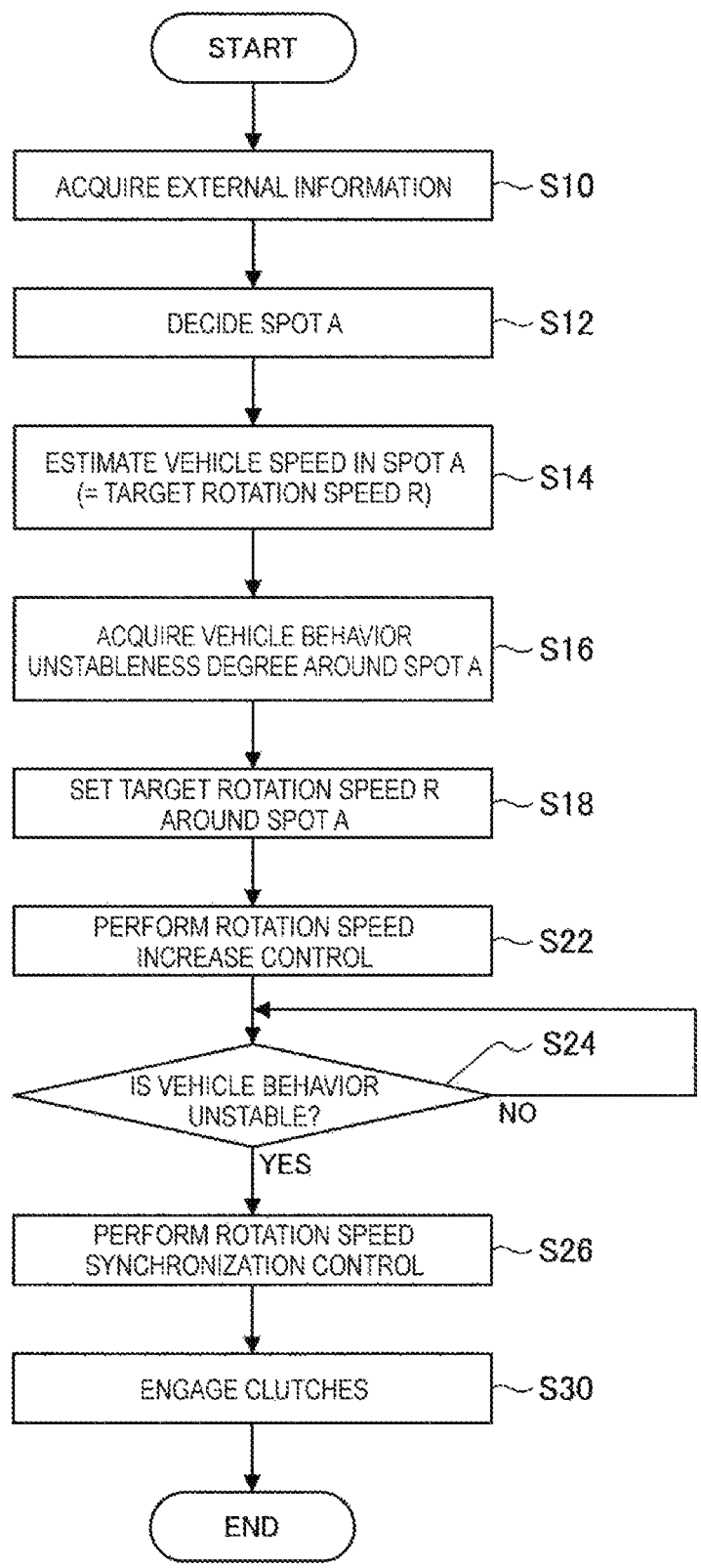
FIG. 10 is a flowchart for describing processing performed in a control apparatus in a second example.

Next, on the basis of the flowchart of FIG. 10, processing performed in the control apparatus 200 in the second example will be described. First, in step S10, the external information acquirer 210 acquires external information. Next, in step S12, the clutch engagement decider 213 decides the spot A, where the clutches 150 and 152 are engaged.

Next, in step S14, the vehicle speed estimator 214 estimates the vehicle speed in the spot A. Next, in step S16, the vehicle behavior unstableness degree determiner 224 acquires the vehicle behavior unstableness degree around the spot A. This offers the distribution of vehicle behavior unstableness degrees as illustrated in FIG. 5.

Next, in step S18, the target rotation speed setting module 216 sets the target rotation speed around the spot A. On the basis of an estimation result of the vehicle speed in step S14, the target rotation speed R is decided. In addition, the target rotation speed around the spot A is set in accordance with the distribution of vehicle behavior unstableness degrees around the spot A.

Next, in step S22, control is begun to increase the rotation speed of the motor 110. This increases the rotation speed of the motor 110 in advance to the target rotation speed around the spot A illustrated in FIG. 7 in accordance with the spot where the vehicle 1000 is positioned.

Next, in step S24, the skid determiner 222 determines whether any skid happens to the vehicle, that is, whether the vehicle behavior is unstable. If the vehicle behavior is unstable, the flow proceeds to step S26 to perform rotation speed synchronization control. This increases the rotation speed of the motor 110 to the target rotation speed corresponding to the vehicle behavior unstableness degree. Next, in step S30, the clutches 150 and 152 are engaged with the rotation speed of the motor 110 increased to the target rotation speed.

Further, if it is determined in step S24 that the vehicle behavior is not unstable, the flow waits in step S24.

According to the processing in step S24 and step S26, rotation speed synchronization control is performed when the vehicle behavior becomes unstable. Thus, in the first example, rotation speed synchronization control is not performed unless the spot B is passed. However, in the second example, when the vehicle behavior becomes unstable such as skid occurrence, rotation speed synchronization control is also performed, which allows for a transition to AWD earlier. It is thus possible to surely make the vehicle behavior stable.

As described above, increasing the motor rotation speed in advance in accordance with the vehicle behavior unstableness degree makes it possible to bring the motor rotation speed in agreement with the rotation speed of the wheels 100 and 102 in a short time when a skid determination or the like is made and the vehicle behavior becomes unstable. It is thus possible to switch to AWD in a short time.

As described above, according to the example, it is possible to avoid a response delay when a spinning wheel is coupled to a drive source.

Although the preferred examples of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. A control apparatus for a vehicle, the control apparatus comprising:
a processor coupled to a memory storing instructions, the processor being configured to decide, on a basis of a traveling state of the vehicle that a wheel which is spun is coupled to a drive source, to increase a number of driving wheels; and
a rotation speed controller configured to increase a rotation speed of the drive source in advance in accordance with information of a vehicle behavior unstableness degree which is acquired from an outside of the vehicle before the wheel is coupled to the drive source,
wherein the rotation speed controller controls the rotation speed of the drive source such that the rotation speed of the drive source becomes a target rotation speed of the drive source in a target spot where the wheel, which is spun to the drive source in a future, is coupled, the target rotation speed being set on a basis of an estimated vehicle speed in the target spot.

2. The control apparatus for a vehicle according to claim 1, wherein the processor is further configured to determine the vehicle behavior unstableness degree on a basis of an external information acquired from the outside of the vehicle, and
wherein the processor determines the vehicle behavior unstableness degree on a basis of a first information indicating a danger degree of a road surface and a second information indicating a reliability of the first information.

3. The control apparatus for a vehicle according to claim 2, wherein the first information is acquired from another vehicle, a weather forecast, or a live camera installed on a road.

4. The control apparatus for a vehicle according to claim 3, wherein the rotation speed controller starts the drive source in a spot before the target spot such that the rotation speed of the drive source becomes a same as the target rotation speed in the target spot.

5. The control apparatus for a vehicle according to claim 3, wherein the rotation speed controller increases the rotation speed of the drive source around the target spot in advance to a rotation speed decided from the target rotation speed and the vehicle behavior unstableness degree.

6. The control apparatus for a vehicle according to claim 3, wherein the information of the vehicle behavior unstableness degree includes information indicating an unstableness degree of a vehicle behavior corresponding to a road surface condition under which the vehicle travels.

7. The control apparatus for a vehicle according to claim 2, wherein the rotation speed controller starts the drive source in a spot before the target spot such that the rotation speed of the drive source becomes a same as the target rotation speed in the target spot.

8. The control apparatus for a vehicle according to claim 2, wherein the rotation speed controller increases the rotation speed of the drive source around the target spot in advance to a rotation speed decided from the target rotation speed and the vehicle behavior unstableness degree.

9. The control apparatus for a vehicle according to claim 2, wherein the information of the vehicle behavior unstableness degree includes information indicating an unstableness degree of a vehicle behavior corresponding to a road surface condition under which the vehicle travels.

10. The control apparatus for a vehicle according to claim 1, wherein the rotation speed controller starts the drive source in a spot before the target spot such that the rotation speed of the drive source becomes a same as the target rotation speed in the target spot.

11. The control apparatus for a vehicle according to claim 1, wherein the rotation speed controller increases the rotation speed of the drive source around the target spot in advance to a rotation speed decided from the target rotation speed and the vehicle behavior unstableness degree.

12. The control apparatus for a vehicle according to claim 1, wherein the information of the vehicle behavior unstableness degree includes information indicating an unstableness degree of a vehicle behavior corresponding to a road surface condition under which the vehicle travels.

13. A control method for a vehicle, the control method comprising:
deciding, on a basis of a traveling state of the vehicle that a wheel which is spun is coupled to a drive source, to increase a number of driving wheels; and
increasing a rotation speed of the drive source in advance in accordance with information of a vehicle behavior unstableness degree which is acquired from an outside of the vehicle before the wheel is coupled to the drive source,
wherein the rotation speed of the drive source is controlled by a processor such that the rotation speed of the drive source becomes a target rotation speed of the drive source in a target spot where the wheel, which is spun to the drive source in a future, is coupled, the target rotation speed being set on a basis of an estimated vehicle speed in the target spot.

14. A control apparatus for a vehicle, the control apparatus comprising:
a circuitry configured to:
decide, on a basis of a traveling state of the vehicle that a wheel which is spun is coupled to a drive source, to increase a number of driving wheels, and
increase a rotation speed of the drive source in advance in accordance with information of a vehicle behavior unstableness degree which is acquired from an outside of the vehicle before the wheel is coupled to the drive source,
wherein the circuitry controls the rotation speed of the drive source such that the rotation speed of the drive source becomes a target rotation speed of the drive source in a target spot where the wheel, which is spun to the drive source in a future, is coupled, the target rotation speed being set on a basis of an estimated vehicle speed in the target spot.

* * * * *